No. 629,713. Patented July 25, 1899.
E. M. COUCH.
AUTOMATIC SPINDLE CHUCK.
(Application filed June 23, 1898.)
(No Model.) 2 Sheets—Sheet 2.
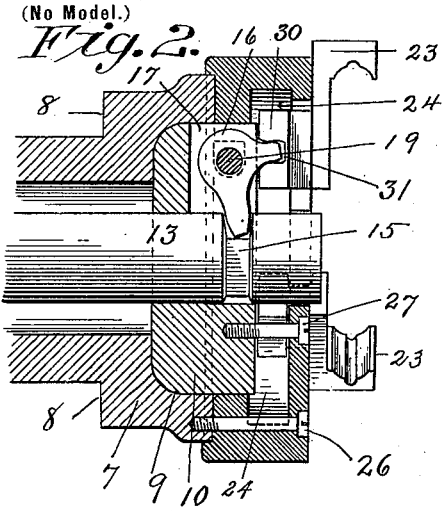
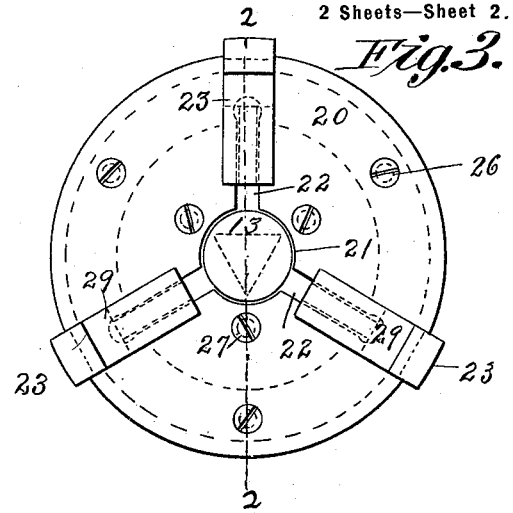
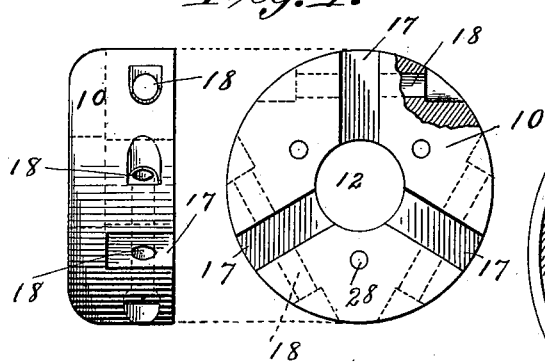
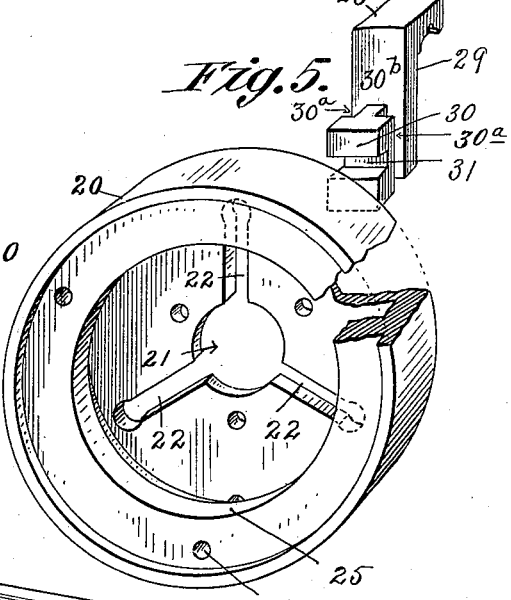
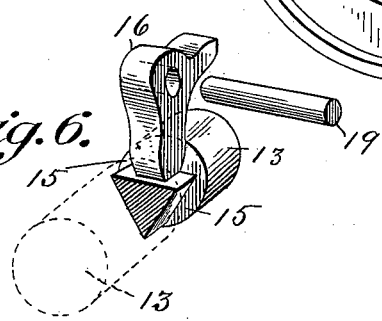
Witnesses:
Inventor:
Elbert M. Couch
by Chapin & Co
Attorneys

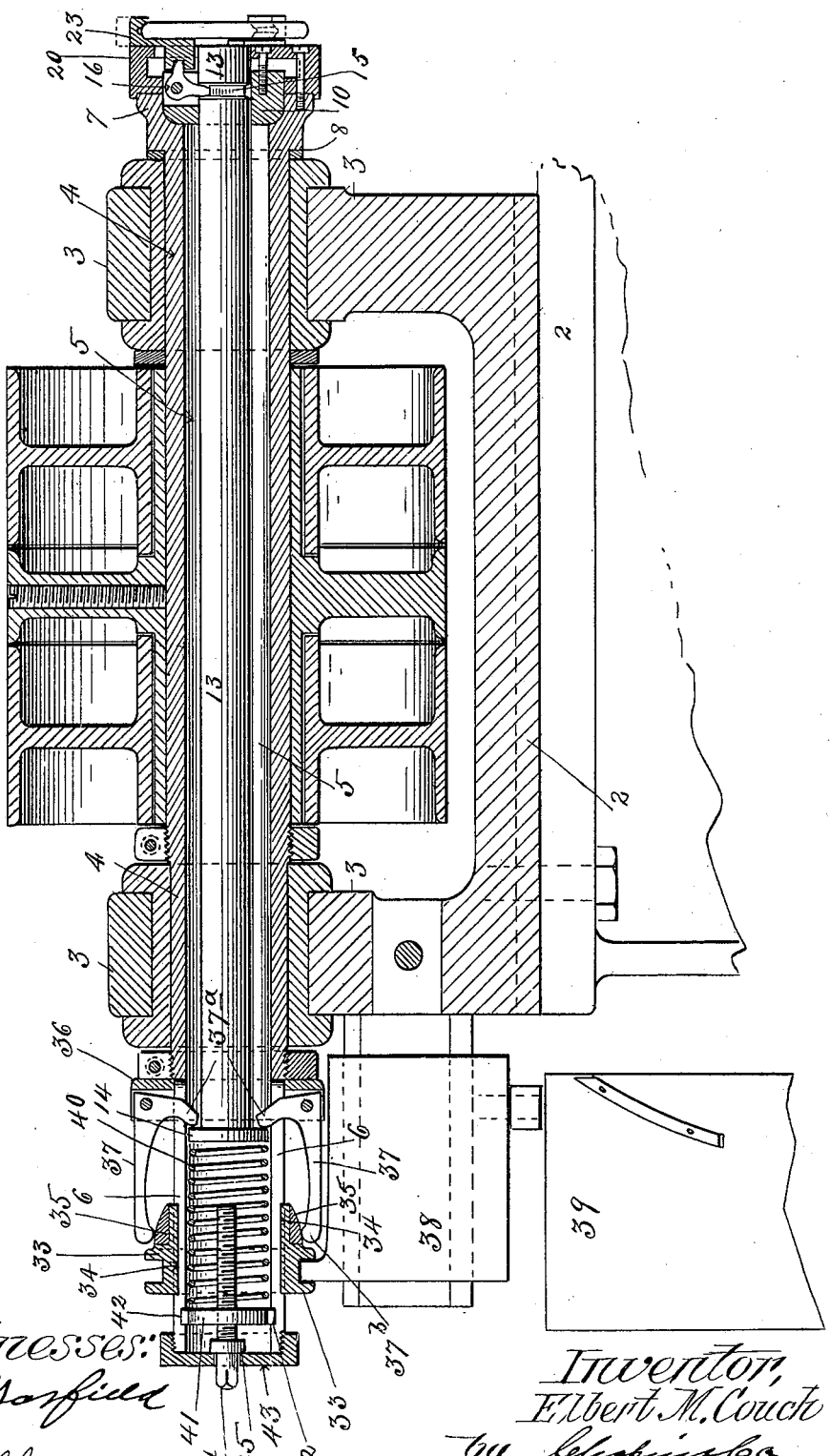

UNITED STATES PATENT OFFICE.

ELBERT M. COUCH, OF NORTHAMPTON, MASSACHUSETTS, ASSIGNOR TO THE PRATT & WHITNEY COMPANY, OF HARTFORD, CONNECTICUT.

AUTOMATIC SPINDLE-CHUCK.

SPECIFICATION forming part of Letters Patent No. 629,713, dated July 25, 1899.

Application filed June 23, 1898. Serial No. 684,276. (No model.)

*To all whom it may concern:*

Be it known that I, ELBERT M. COUCH, a citizen of the United States of America, residing at Northampton, in the county of Hampshire and State of Massachusetts, have invented new and useful Improvements in Automatic Spindle-Chucks, of which the following is a specification.

This invention relates to automatically-operated chucks, and has for its object the construction of a chuck of this class having two or more radially-moving jaws automatically operated by a plunger having a longitudinal movement in the spindle to which the chuck is secured and provided with an interchangeable connection between said plunger and said jaws, whereby the radial movement of the latter may be varied to adapt the chuck to a great variety of work.

A further object of the invention is the application of yielding pressure to said jaw-operating plunger whereby said jaws may be moved in one direction for releasing a piece of work held therebetween or for moving said jaws into engagement with the interior surface of hollow objects which are to be operated upon by the machine and which may be too fragile to be successfully handled by positively-operated jaws.

The invention consists in the construction hereinafter fully described, and particularly pointed out in the claims.

In the drawings forming part of this specification, Figure 1 shows the chuck embodying this invention applied to the spindle of an automatic screw-machine and representing the parts in longitudinal section and showing the chuck-jaws closed. Fig. 2 is an enlarged longitudinal section of the chuck and a portion of the spindle on which it is carried and showing the chuck-jaws open. Fig. 3 is a face view of the chuck shown in Fig. 2. Fig. 4 is an edge and face view of an interchangeable block in which are supported the jaw-operating levers. Fig. 5 is a perspective view of the circular jaw-plate and a jaw separated from said plate. Fig. 6 is a perspective view of a part of the jaw-operating plunger, one of the connections between said plunger and jaw, and a pin on which said connection is pivotally supported.

In Fig. 1, 2 represents a portion of the frame of a machine having the standards 3, in which the hollow spindle 4 is supported in suitable bearings in the usual manner. Said spindle is provided with tight and loose driving-pulleys located thereon between said standards.

The spindle 4 has the longitudinal passage 5 extending therethrough, and the end of the spindle opposite the chuck-carrying end has two oppositely-located slots 6 through the wall thereof and parallel with the axis of the spindle, through which slots certain parts to be described operate the chuck.

The chuck-receiving end of the spindle 4 has formed thereon and preferably integral therewith the annular head 7, having a square shoulder 8 for bearing against the end of the bearing in which said spindle rotates. In said head is the concentric annular cavity 9 for the reception of the circular block 10, which is provided with the central perforation 12 for the reception and support of one end of the plunger 13, whose opposite end is provided with a circular head 14, which fits closely the bore of the passage 5 in the spindle. Said plunger moves freely in said passage and in that part thereof lying within the circular block 10 has suitable cuts 15, made therein at right angles to the axis of said plunger for the reception of the ends of jaw-operating connections supported in said block. Said connections 16 are substantially right-angled levers pivotally supported in radial slots 17 in the block 10. Said slots extend from the central perforation 12 in said block to the periphery thereof, and their depth is less than the thickness of said block, as shown by the sectional views in the drawings. At suitable points in said block 10 holes 18 are bored therethrough at right angles to said slots 17, and pins 19, located in said holes, support the levers 16, the latter swinging freely on said pins, with their jaw-engaging ends projecting from said radial slots in the block 10 and their plunger-engaging ends converging toward the center of said block and projecting from the inner ends of said slots into the perforation 12, extending axially therethrough and in position to engage the cuts 15 above mentioned, which lie opposite the inner ends of the said slots 17.

The location of the said slots 17 and the holes 18 for the pivot-pins is clearly shown in Fig. 4, and Fig. 2 shows the parts assembled. The section of the block shown is substantially on line 2 2, Fig. 3, thus showing one of the right-angled-lever connections between a chuck-jaw and the plunger in operative position.

The jaw-carrying face-plate 20 of the chuck is cup-shaped, and in the closed end thereof is the central aperture 21. The radial slots 22 extend from said aperture nearly to the rim of said plate. These slots receive the sliding jaws 23 and are of the same number and located in the same plane relative to the axis of the spindle as the slots 17 in the block 10.

Between the back side of the face-plate 20 and the forward end of the circular block 10 is an annular cavity 24, of sufficient depth to permit the unobstructed movement of that part of the sliding jaws 23 lying back of said face-plate with which the ends of the levers 16, which project beyond the face of the block 10, engage. Said face-plate, back of said cavity 24, is turned out to fit closely over the said block 10, as shown at 25, Fig. 5. When the parts are assembled, the screws 26 near the edge of said face-plate 20 are passed through the latter into suitably-tapped holes in the rim of the concave head 7, binding the plate thereto, and other screws 27 pass through said plate nearer the center thereof and enter the holes 28 (shown in the block 10 in Fig. 4) to prevent the rotation of the latter in the cavity 9, and thus insuring the constant registration of the radial slots 17 in said head with the slots 22 in the face-plate.

The sliding jaws 23 are made as shown in perspective in Fig. 5 and in front and side elevation in Figs. 2 and 3, and consist of the usual L-shaped work-grasping part 29, lying on the outer surface of the face-plate, and the part 30, integral therewith, lying between the back side of the face of the plate 20 and the face of the block 10, the rearmost surface of said part 30 being close to the face of said block and having a transverse slot 31 cut therein for receiving the end of the lever 16, projecting from the face of said block, as stated. Said jaws are made wider than the slots 22 in said face-plate 20, and two parallel grooves $30^a$ are cut in the sides thereof to form the narrow connecting portion $30^b$ between the parts 29 and 30 of said jaws, which portion fits the said slots 22 and leaves a bearing for the jaws on each side of the plate 20, the form of said slot and the end of said lever 16, engaging therewith, being substantially the same as the teeth of a rack and pinion having the same pitch-line.

The circular aperture 21 through the center of the face-plate 20 is of such diameter as to admit the part 30 of the jaw for the purpose of placing said jaws in their respective slots 22.

The form of the cuts 15 in the plunger 13 (shown in Fig. 6) is adopted only to insure the retention of the greatest cross-sectional area possible after making said cuts. It would serve every purpose to simply turn an annular groove in the plunger at that point instead of making the cuts of the form shown.

From the above description it is obvious that the movement of the plunger 13 longitudinally in the hollow spindle will through the rectangular-lever connections 16 impart to the jaws of the chuck a radial movement at right angles to the line of movement of said plunger. Means for moving said plunger consist of a grooved collar 33 on the end of the hollow spindle 4 opposite to that to which the chuck is secured and provided with suitable feathers 34, engaging the oppositely-located slots 6 in said spindle, which permits said collar to have a free sliding movement on said spindle while rotating with it. On said collar are two oppositely-located wedges 35.

On a collar 36 two rectangular levers 37 are pivotally supported, the short ends $37^a$ of which enter the slots 6 in the spindle for engagement with the head 14 on the plunger 13 on the side of said head nearest the chuck. The opposite longer ends $37^b$ of said levers have rounded extremities, and the wedges 35 on the collar 33 are adapted to move in under said ends $37^b$ of said levers, thus bringing the short ends thereof to bear against the head 14 of said plunger, forcing the latter back from the chuck and causing the jaws thereof to close in toward the center of said chuck, suitable mechanism being employed to impart movement to said collar 33.

In the drawings the mechanism shown consists of that employed on a well-known type of automatic screw-machine comprising a block 38, having a sliding movement on the frame of the machine under said spindle and a stud engaging said grooved collar, a cam-wheel 39, located near said block, and suitable cam-strips on said cam-wheel, whereby by the rotation of said wheel said block may at the proper time be actuated to move said collar 33 back and forth on said spindle to operate the levers 37. When said levers are actuated to move said plunger, as described, away from the chuck on the opposite end of the spindle, said plunger moves against the tension of a coiled spring 40 in the hollow spindle 4, one end of said spring abutting against the head 14 on said plunger. The opposite end of the spring abuts against a disk 41, which fits the bore of the spindle and is provided with ears 42 thereon for engagement with the slots 6 in said spindle, and thereby kept from turning therein.

On the end of the spindle is screwed a cap 43, having a hole central therein, through which the head of a screw 44 may project, which screw has a threaded engagement with said disk 41 and is provided with a collar 45 near its head, which bears on the inside of the cap 43. The tension of the spring will hold the said collar on said screw against said cap, and by turning said screw said tension may be increased or diminished by the movement imparted to the disk 41 in the spindle.

The function of the spring applied as above described is to impart movement to the plunger 13 in the direction of the chuck after the collar 33 has been moved back to release the levers 37 from engagement with the wedges 35, which movement of the plunger moves the chuck-jaws away from the center of the said chuck. Only a slight degree of tension need be put on said spring to accomplish the unchucking movement above described.

If it is desired to use the chuck to grasp hollow pieces by outward movement of the jaws, the tension of the spring 40 may be increased to any required degree by means of the disk 41, operated by the screw 44, as described. The collar 33 will then be timed to move forward toward the chuck to force the plunger 13 backward and release the article in the chuck, thus compressing the spring 40, and to move in the opposite direction and release the levers 37 from their bearing on the wedges 35, thus leaving the spring 40 free to move the plunger for effecting the engagement of the chuck-jaws, as stated, with the interior surface of any hollow article.

The amount of force under which the chuck-jaws will be forced into engagement with a piece of work, as above stated, can be regulated at will, thus permitting the device to be used in turning up articles of delicate structure, which would frequently be broken by positively-working jaws.

By substituting for the block 10 herein described a similar block having the jaw-operating levers 16 of proportions different from those of the levers shown herein a different degree of movement may be imparted to said jaws by a given movement of the plunger, and thus a chuck adapted to handle all kinds of work may be constructed by means of the invention herein described—viz., a chuck whose jaws for a given movement of the actuating-plunger may either have a wide range of movement and comparatively small power or one having a smaller range of movement and proportionately greater power. In either case the jaws may be used for grasping an object by positive movement toward the center of the chuck or by yielding expansive movement away from said center in the manner above described.

Having thus described my invention, what I claim, and desire to secure by Letters Patent, is—

1. In a chuck having radially-moving jaws, a suitably-supported jaw-actuating plunger having a line of movement transverse to the radial movement of said jaws, connections between said plunger and said jaws whereby movement of said plunger actuates said jaws, and plunger-moving mechanism consisting of oppositely-located, pivoted elbow-levers, one end of which engages said plunger, movable wedges for separating the opposite ends of said levers whereby said plunger is moved in one direction, a spring bearing on said plunger for moving the latter in the opposite direction, and means for regulating the tension of said spring, substantially as described.

2. The combination with a suitably-supported chuck having radially-moving jaws and an axially-supported endwise-movable jaw-actuating member, of a spring for moving said member in one direction for releasing or clamping a piece of work, and mechanism for moving said member in an opposite direction positively, and means for varying the tension of said spring, substantially as described.

3. An automatic chuck comprising a hollow spindle, an endwise-movable member axially supported therein, radially-movable chuck-jaws, elbow-levers engaging said jaws and said endwise-movable member, a block supported removably in the head of said spindle in which said elbow-levers are hung, means for moving said member endwise positively in one direction, a spring in said spindle against which said member moves, a disk in said hollow spindle, and a screw supported on the latter for moving said disk to compress said spring, substantially as described.

ELBERT M. COUCH.

Witnesses:
K. I. CLEMONS,
H. A. CHAPIN.